United States Patent
Kurishige et al.

(10) Patent No.: US 8,548,684 B2
(45) Date of Patent: Oct. 1, 2013

(54) ELECTRIC POWER STEERING CONTROL APPARATUS

(75) Inventors: Masahiko Kurishige, Tokyo (JP); Takayuki Kifuku, Tokyo (JP); Koji Nagao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 531 days.

(21) Appl. No.: 12/990,958

(22) PCT Filed: Nov. 4, 2008

(86) PCT No.: PCT/JP2008/003165
§ 371 (c)(1),
(2), (4) Date: Nov. 4, 2010

(87) PCT Pub. No.: WO2010/013298
PCT Pub. Date: Feb. 4, 2010

(65) Prior Publication Data
US 2011/0054740 A1    Mar. 3, 2011

(30) Foreign Application Priority Data

Jul. 30, 2008 (JP) .................................. 2008-195889

(51) Int. Cl.
*B62D 6/00* (2006.01)
(52) U.S. Cl.
USPC ......................................................... 701/42
(58) Field of Classification Search
USPC .................. 701/41, 42, 99; 318/400.23, 128, 318/127, 460; 702/54, 56; 73/1.82, 11.05, 73/35.09, 650
See application file for complete search history.

(56) References Cited

U.S. PATENT DOCUMENTS

| 6,161,068 | A  | 12/2000 | Kurishige et al. |
| 7,983,815 | B2 | 7/2011  | Kurishige et al. |

(Continued)

FOREIGN PATENT DOCUMENTS

| JP | 2000 168600 | 6/2000 |
| JP | 2006 335228 | 12/2006 |

(Continued)

OTHER PUBLICATIONS

International Search Report issued Feb. 3, 2009 in PCT/JP08/003165 filed Nov. 4, 2008.

(Continued)

*Primary Examiner* — Khoi Tran
*Assistant Examiner* — Adam Mott
(74) *Attorney, Agent, or Firm* — Oblon, Spivak, McClelland, Maier & Neustadt, L.L.P.

(57) ABSTRACT

To obtain an electric power steering control apparatus hard to generate vibration even when accuracy is not high enough for torque vibration of extremely small output of torque detecting means. An electric power steering control apparatus includes steering torque detecting means, a torque controller that computes an auxiliary torque current, a motor that generates a torque for assisting a steering torque, current steering component removing means for removing a component by steering, vibration velocity estimating means for estimating a vibration velocity in a rotational direction of the motor, and a damping controller that computes a damping current to be added to the auxiliary torque current, and the vibration velocity estimating means includes vibration acceleration computing means for computing vibration acceleration in the rotational direction of the motor by multiplication of a motor current output from the current steering component removing means, and rotational acceleration integrating means for computing the vibration velocity in the motor rotational direction by integrating the vibration acceleration computing means.

8 Claims, 8 Drawing Sheets

(56) References Cited

U.S. PATENT DOCUMENTS

| | | |
|---|---|---|
| 8,019,507 B2 | 9/2011 | Kurishige et al. |
| 2010/0235047 A1 | 9/2010 | Kurishige et al. |
| 2010/0324785 A1 | 12/2010 | Kurishige et al. |
| 2011/0137525 A1 | 6/2011 | Kurishige et al. |

FOREIGN PATENT DOCUMENTS

| | | |
|---|---|---|
| JP | 2007 112189 | 5/2007 |
| JP | 2007 161006 | 6/2007 |
| JP | 2008 1322 | 1/2008 |
| WO | WO 2007/119333 A1 | 10/2007 |

OTHER PUBLICATIONS

Extended European Search Report issued Mar. 4, 2013, in European Patent Application No. 08876655.5.

U.S. Appl. No. 12/990,958, filed Nov. 4, 2010, Kurishige et al.

U.S. Appl. No. 12/962,191, filed Dec. 7, 2010, Kurishige et al.

ELECTRIC POWER STEERING CONTROL APPARATUS

TECHNICAL FIELD

The present invention relates to an electric power steering control apparatus that assists steering force using a motor.

BACKGROUND ART

An electric power steering control apparatus in related art includes steering torque detecting means for detecting a steering torque by an operator, a torque controller that computes an auxiliary torque current for assisting the steering torque based on the detected steering torque signal, a motor that generates a torque for assisting the steering torque, vibration velocity estimating means for estimating a motor vibration velocity in a rotational direction of the motor, a damping controller that computes a damping current to be added to the auxiliary torque current using an estimation value of the estimated motor vibration velocity, and motor current detecting means. The vibration velocity detecting means in the rotational direction is current steering component removing means for removing a component by steering from a detection value or a command value of a current passed through the motor, torque steering component removing means for removing a component by steering from an output of the steering torque detecting means, and a rotational speed observer that is adapted for a vibration equation having moment of inertia of the motor as an inertial term and rigidity of a torque sensor as a spring term and computes the estimation value of the vibration velocity in the motor rotational direction based on the motor current output from the current steering component removing means and the steering torque output from the torque steering component removing means (for example, see Patent Document 1.
Patent Document 1: JP-A-2000-168600 (page 17, Amendment 1, claim 8)

DISCLOSURE OF THE INVENTION

Problems that the Invention is to Solve

The vibration desired to be removed by the electric power steering is generally extremely small vibration of 0.2 Nm or less. When an attempt to correctly detect a steering torque signal in the vibration is made, expensive torque detecting means having a substantially small hysteresis property in detection characteristics is necessary. In the electric power steering control apparatus in related art as shown in Patent Document 1, because of the rotational speed observer that computes the estimation value of the vibration velocity in the motor rotational direction based on the motor current output from the current steering component removing means and the steering torque output from the torque steering component removing means, the accuracy is not high enough for the torque vibration of the extremely small output of the torque detecting means due to the influence of the hysteresis of the torque detecting means or the like, and thus, detection of the vibration component may be impossible or the amplitude may be reduced, by 10% or more. In this case, a difference from a true value of the rotational speed such that a phase delay may occur in the estimation value of the rotational speed observer. Therefore, even when damping is performed by multiplying the estimation value of the rotational speed observer by gain, the vibration suppression effect becomes lower than in the case where damping is performed by multiplying the true value of the rotational speed by gain, and there has been a problem that inexpensive torque detecting means with accuracy not high enough is not applicable.

The invention has been achieved to solve the above described problem, and is intended to obtain an electric power steering control apparatus that can perform damping control by estimating a correct vibration velocity in a rotational direction of a motor even when the above described inexpensive torque detecting means with accuracy not high enough is used for torque vibration of extremely small output of the torque detecting means.

Means for Solving the Problems

An electric power steering control apparatus according to the invention is an electric power steering control apparatus characterized by including steering torque detecting means for detecting a steering torque by an operator from a relative angle of a torsion bar, a torque controller that computes an auxiliary torque current for assisting the steering torque based on the detected steering torque signal, a motor that generates a torque for assisting the steering torque, current steering component removing means for removing a component by steering from a detection value or a command value of a current passed through the motor, vibration velocity estimating means for estimating a vibration velocity in a rotational direction of the motor, and a damping controller that computes a damping current to be added to the auxiliary torque current using an estimation value of the estimated motor vibration velocity, wherein the vibration velocity estimating means includes vibration acceleration computing means for computing vibration acceleration in the rotational direction of the motor by multiplication of a motor current output from the current steering component removing means, and rotational acceleration integrating means for computing the vibration velocity in the motor rotational direction by integrating an output of the vibration acceleration computing means.

Advantages of the Invention

According to the invention, since an electric power steering control apparatus includes steering torque detecting means for detecting a steering torque by an operator from a relative angle of a torsion bar, a torque controller that computes an auxiliary torque current for assisting the steering torque based on the detected steering torque signal, a motor that generates a torque for assisting the steering torque, current steering component removing means for removing a component by steering from a detection value or a command value of a current passed through the motor, vibration velocity estimating means for estimating a vibration velocity in a rotational direction of the motor, and a damping controller that computes a damping current to be added to the auxiliary torque current using an estimation value of the estimated motor vibration velocity, and the vibration velocity estimating means includes vibration acceleration computing means for computing vibration acceleration in the rotational direction of the motor by multiplication of a motor current output from the current steering component removing means, and rotational acceleration integrating means for computing the vibration velocity in the motor rotational direction by integrating an output of the vibration acceleration computing means, a nonconventional remarkable effect that an electric power steering control apparatus that can perform damping control by estimating the correct vibration velocity in the motor rotational direction may be obtained even when the above described inexpensive torque detecting means with accuracy not high enough is used may be exerted.

DESCRIPTION OF REFERENCE NUMERALS AND SIGNS

1 torque sensor, 2 phase compensator, 3 torque controller, 4 drive current HPF, 5 rotational velocity computer, 5a vibration acceleration computing unit, 5b acceleration integrator, 5c velocity integrator, 5d reaction force torque acceleration computing unit, 5e acceleration adder, 6 damping controller, 7 adder, 8 current controller, 9 motor, 10 current detector.

BEST MODE FOR CARRYING OUT THE INVENTION

Each of embodiments of the invention is explained based on the drawings below.

Embodiment 1

Figure 1:
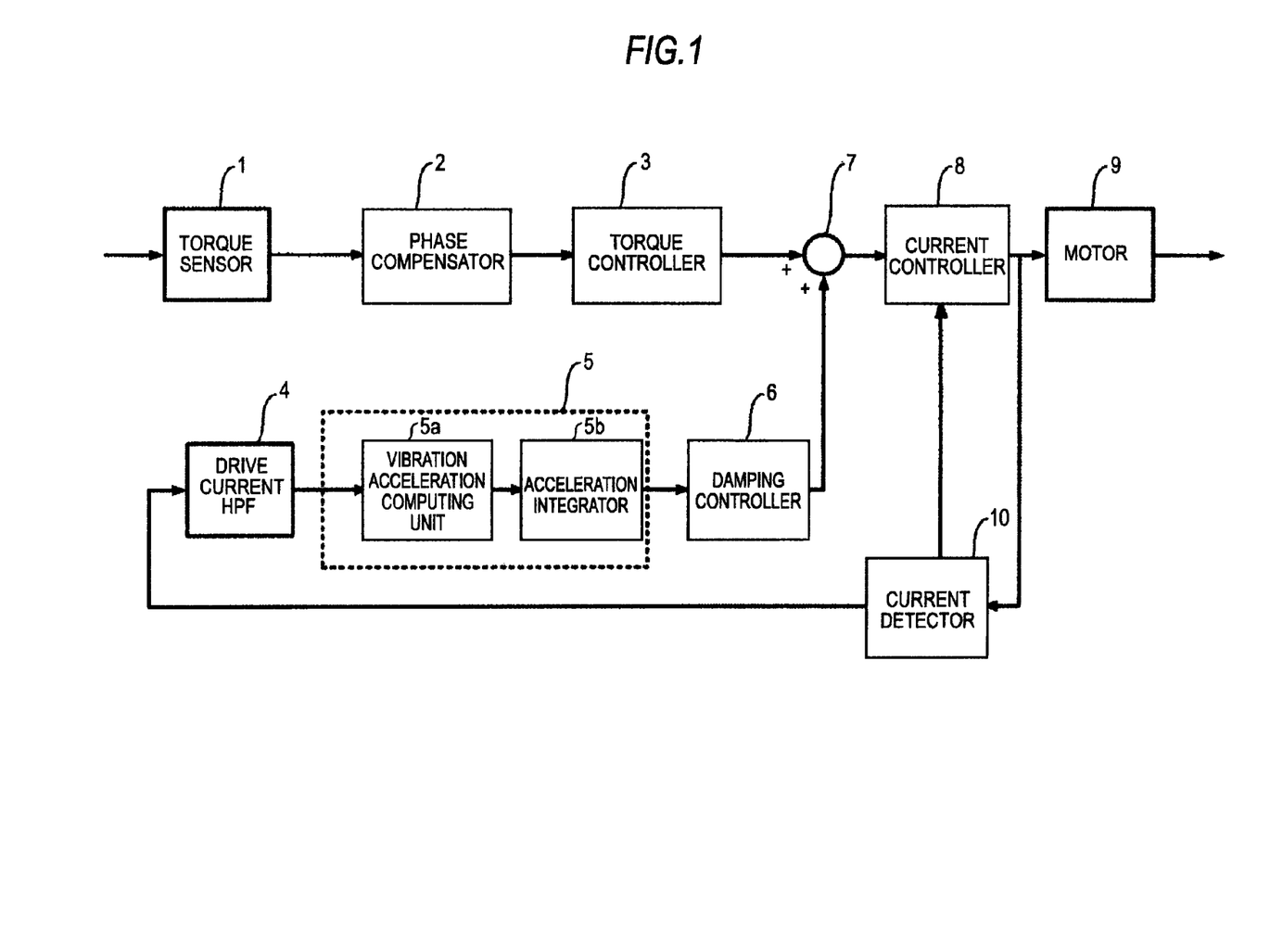
FIG. 1 A block diagram showing a configuration of an electric power steering control apparatus according to embodiment 1 of the invention.

FIG. 1 is a block diagram showing a configuration of an electric power steering control apparatus according to embodiment 1 of the invention. In the same drawing, an output signal of a torque sensor 1 that detects a steering torque when an operator steers is phase-compensated by a phase compensator 2, and its frequency characteristics are improved. Then, based on the output of the torque sensor 1 phase-compensated by the phase compensator 2, an auxiliary torque current that assists the steering torque is computed by a torque controller 3.

On the other hand, a drive current high-pass filter (hereinafter, referred to as "drive current HPF") 4 as steering component removing means removes a steering frequency component from a current detection signal detected by a current detector 10. Then, a vibration velocity estimator 5 computes a vibration component of a motor rotational speed from an output of the drive current HPF. Here, the vibration velocity estimator 5 includes a vibration acceleration computing unit 5a that computes vibration acceleration in a motor rotational direction by motor torque by multiplying the output of the drive current HPF by gain and an acceleration integrator 5b that computes a vibration velocity in the motor rotational direction by integrating it as component elements. Further, a damping controller 6 computes a damping current for controlling the damping characteristics of steering based on a motor vibration velocity signal as an output of the vibration velocity estimator 5.

Then, the auxiliary torque current computed in the torque controller 3 and the damping current computed in the damping controller 6 are added by an adder 7, and a target current is computed. Then, at the output terminal of a current controller 8, a current passed through a motor 9 is controlled to be equal to the target current. PI control computation is performed on the difference between the target current and the current detection signal, for example, so that the motor 9 may generate an assist torque, and thereby, a drive voltage command value to be applied to the input terminal of the motor 9 is set. The drive voltage command value is output as a PWM signal, for example.

Figure 2:
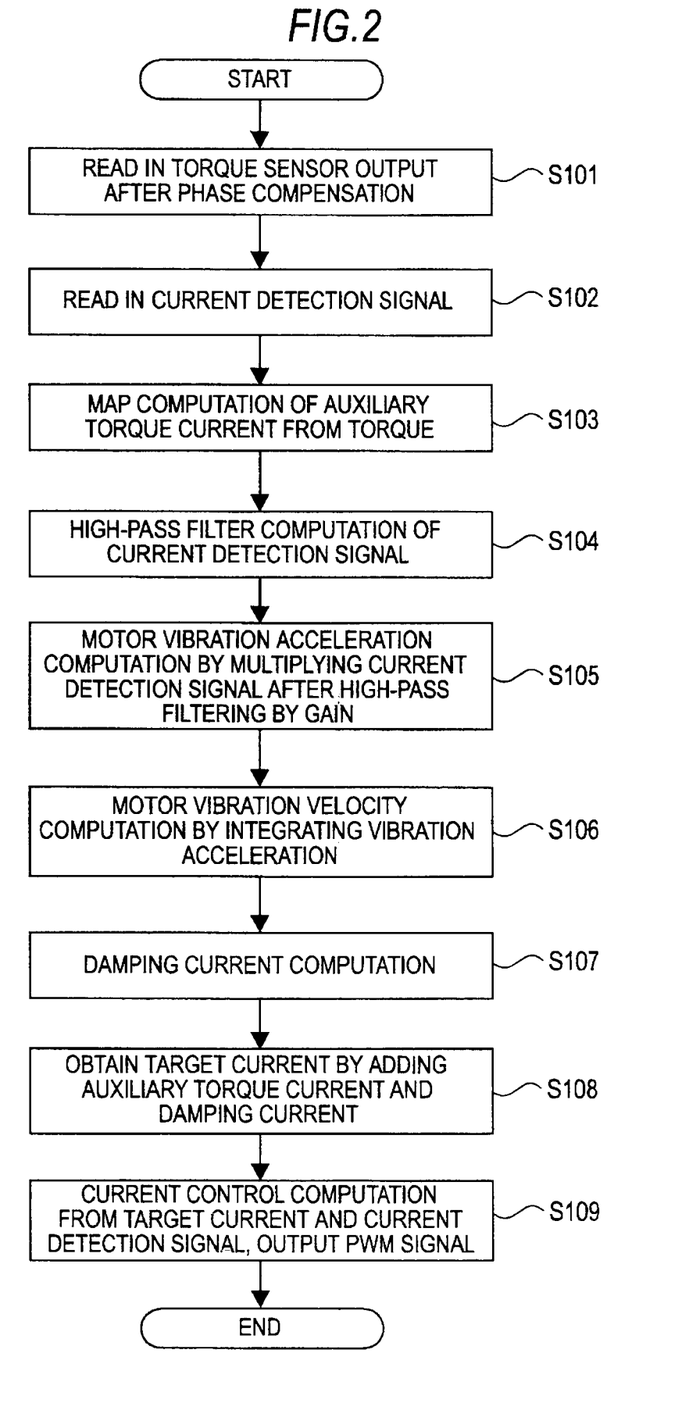
FIG. 2 A flowchart showing an algorithm of embodiment 1 of the invention.

Then, an operation of the electric power steering control apparatus having the above described configuration will be explained with reference to a flowchart in FIG. 2.

At step S101, the output of the torque sensor 1 phase-compensated by the phase compensator 2 is read in a microcomputer and stored in a memory, and, at step S102, the current detection signal is read in and stored in the memory. The current detection signal may be obtained by detection of a voltage drop of a shunt resistance, for example. Then, at step S103, by the torque controller 3, the torque sensor output after phase compensation stored in the memory is read in and the auxiliary torque current is map-computed and stored in the memory.

At step S104, in the drive current HPF 4, the current detection signal stored in the memory is read in, computation of the high-pass filter is performed thereon, and stored in the memory as the drive current HPF output, and, at step S105, in the vibration acceleration computing unit 5a, the motor vibration acceleration in the motor rotational direction is computed by multiplying the drive current HPF output by gain. At step S106, in the acceleration integrator 5b, the motor vibration velocity in the motor rotational direction is computed by integration of the motor vibration acceleration. At step S107, using the damping controller 6, the damping current is computed by reading in the rotational speed computer output stored in the memory and multiplying it by control gain, and stored in the memory. At step S108, in the adder 7, the auxiliary torque current and the damping current stored in the memory are added and stored as the target current in the memory. At step S109, PI control computation is performed on the difference between the target current and the current detection signal, and the drive voltage command value is set. The drive voltage command value is output as a PWM signal, for example, and applied to the terminal of the motor 9 for driving. The operation from the steps S101 to S109 is repeated with respect to each control sampling.

Note that maps and constants such as proportionality coefficients necessary for computation of the target current such as the map showing the relation between the torque sensor output and the auxiliary torque current used at step S103, the gain used at step S105 for converting the drive current HPF output into the vibration acceleration in the motor rotational speed, and the control gain used at step S107 for computation of the damping current are set in a ROM in advance.

Here, the drive current HPF 4 as the steering component removing means will be explained. Generally, the frequency steerable by an operator is about 3 Hz or less. Further, for example, the steering frequency at lane change is around 0.2 Hz, and typically, there are many cases of such low-frequency steering. On the other hand, the frequency band in which steering oscillation easily occurs is 30 Hz or more, and frequency separation from the steering frequency is possible.

Therefore, in the frequency range in which steering oscillation occurs, a high-pass filter expressed by a transfer function of the following expression (1) or the like is used as a frequency separator, and thereby, the steering frequency component may be removed and only the vibration component may be obtained.

$$T_3 s/(T_3 s+1) \quad (1)$$

Here, $T_3$ is a time constant, and, given that a corner frequency is $f_3$ [Hz], the following expression is obtained.

$$T_3 = 1/\{f_3 \times (2\pi)\} \quad (2)$$

In this regard, generally, when the corner frequency of the high-pass filter is set lower, the component by steering is easily left, and, when it is set higher, the phase shift of the steering oscillation component of the current detection signal obtained through the high-pass filter becomes larger. Thus, if the corner frequency of the high-pass filter is set to any frequency within the range from the steering frequency typically used to the frequency at which steering oscillation occurs, the steering frequency component can be removed with the steering oscillation component of the current detection signal left. Therefore, in embodiment 1, as the drive current HPF 4, a high-pass filter with the corner frequency set in a range from 0.2 to 30 Hz is used to aim the maximum frequency steerable by a general operator, and the steering oscillation component of the current detection signal from which the steering component has been removed is obtained.

Further, the relation between the current and the motor torque is a known value as torque constant Kt. By multiplying the output of the drive current HPF 4 by the torque constant Kt and dividing it by rotation moment of inertia Jm, conversion into the motor vibration acceleration in the motor rotational direction may be performed. Concurrently, a reaction force torque from the torque sensor and a reaction force torque from a tire are transmitted to the motor, however, since the moment of inertia is generally proportional to square of vibration frequency, when the vibration frequency is high, the influence of the reaction force from the torque sensor and the reaction force torque from the tire is relatively small and negligible.

Therefore, the output of the drive current HPF may be converted into the motor vibration acceleration in the motor rotational direction by multiplying it by gain Kt/Jm.

Further, the motor vibration velocity in the motor rotational direction may be obtained by integration of the motor vibration acceleration in the motor rotational direction.

As described above, in the embodiment 1, since the damping current is computed based on the motor vibration velocity computed from the current detection signal from which the steering frequency component has been removed, even when the accuracy is not high enough for the torque vibration of the extremely small output of the torque detecting means as described above, damping control may be performed by estimating the correct motor vibration velocity, and if torque-proportional gain is made greater, oscillation of the control system can be prevented. Therefore, the effect of damping may be stronger by increasing the damping control gain of the damping controller 6, and thus, the steering torque can be reduced while the operator may not feel the vibration of the handle.

Embodiment 2

Figure 5:
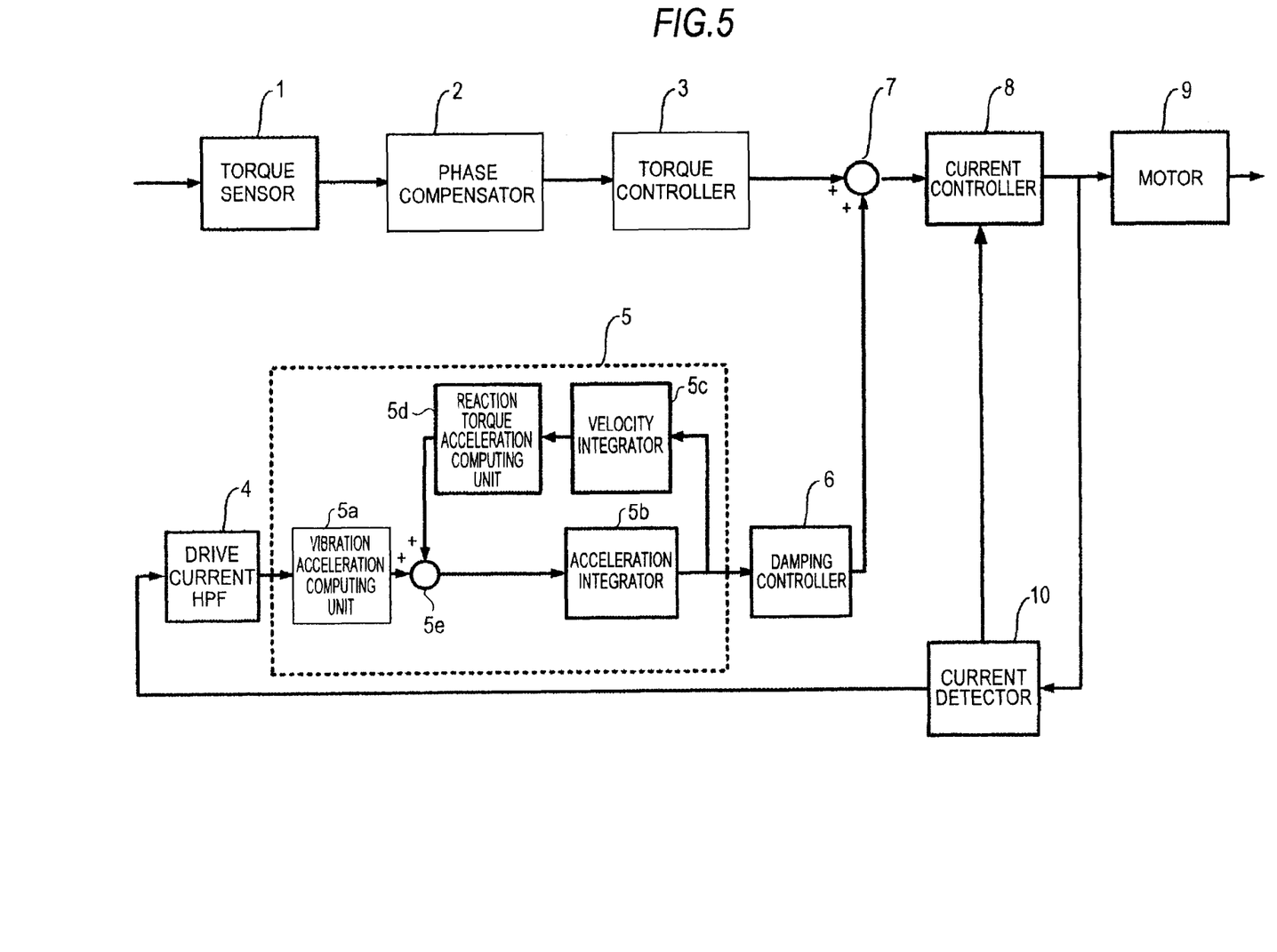
FIG. 5 A block diagram showing a configuration of an electric power steering control apparatus according to embodiment 2 of the invention.

FIG. 5 is a block diagram showing a configuration of an electric power steering control apparatus according to embodiment 2 of the invention. The parts except the vibration velocity estimator 5 that computes the vibration component of the motor rotational velocity from the drive current HPF have completely the same configurations as those in embodiment 1, and their explanation will be omitted. The vibration velocity estimator 5 includes a vibration acceleration computing unit 5a that computes motor torque vibration acceleration in a motor rotational direction by motor torque by multiplying the output of the drive current HPF 4 by gain, an acceleration adder 5e that adds an output of a reaction force torque acceleration computing unit 5d that outputs the reaction force torque from the torque sensor and the reaction force torque from the tire in the dimension of acceleration, an acceleration integrator 5b that computes a motor vibration velocity in the motor rotational direction by integrating the output of the acceleration adder 5e, and a velocity integrator 5c that computes a motor vibration angle in the motor rotational direction by integrating the output of the acceleration integrator 5b. The reaction force torque acceleration computing unit 5d obtains a reaction force torque acceleration signal by multiplying the motor vibration angle in the motor rotational direction computed in the velocity integrator 5c by gain. Thus obtained motor vibration velocity signal is output to the damping controller 6 as is the case of embodiment 1.

Figure 6:
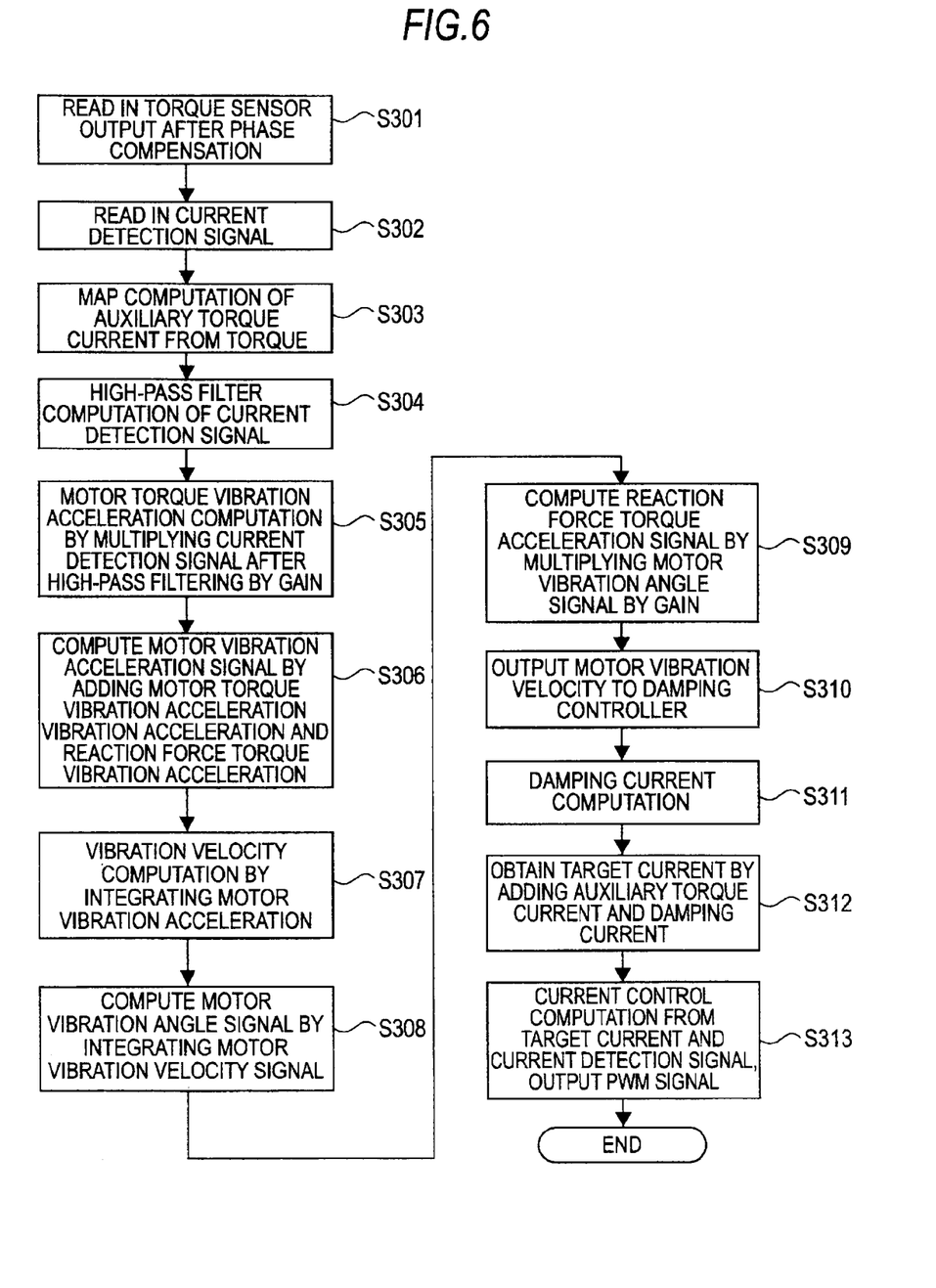
FIG. 6 A flowchart showing an algorithm of embodiment 2 of the invention.

Next, an operation of the electric power steering control apparatus having the above described configuration will be explained with reference to a flowchart in FIG. 6.

At step S301, the output of the torque sensor 1 phase-compensated by the phase compensator 2 is read in a microcomputer and stored in a memory, and, at step S302, the current detection signal is read in and stored in the memory. The current detection signal may be obtained by detection of a voltage drop of a shunt resistance, for example.

Then, at step S303, by the torque controller 3, the torque sensor output after phase compensation stored in the memory is read in and the auxiliary torque current is map-computed and stored in the memory.

At step S304, in the drive current HPF 4, the current detection signal stored in the memory is read in, computation of the high-pass filter is performed thereon, and stored in the memory as the drive current HPF output, and, at step S305, in the vibration acceleration computing unit 5a, motor torque vibration acceleration in the motor rotational direction by the torque generated by the motor is computed by multiplying the drive current HPF output by gain. At step S306, in the acceleration adder 5e, the motor torque vibration acceleration signal computed in the vibration acceleration computing unit 5a and the reaction force torque acceleration signal computed in the reaction force torque acceleration computing unit 5d and stored in the memory are added and stored as a motor vibration acceleration signal in the memory. At step S307, in the acceleration integrator 5b, the motor vibration acceleration is integrated and the motor vibration velocity in the motor rotational direction is computed and stored in the memory. At step S308, in the velocity integrator 5c, the motor vibration angle signal is computed by integrating the motor vibration velocity signal, and stored in the memory. At step S309, in the reaction force torque acceleration computing unit, the reaction force torque acceleration signal as a conversion of the reaction force torque form the torque sensor and the reaction force torque from the tire in the dimension of the acceleration by multiplying the motor vibration angle signal by gain, and stored in the memory. At step S310, the motor vibration velocity stored in the memory in the acceleration integrator 5b is output to the damping controller 6.

At step S311, using the damping controller 6, the damping current is computed by multiplying the motor vibration velocity by control gain, and stored in the memory. At step S312, in the adder 7, the auxiliary torque current and the damping current stored in the memory are added and stored as the target current in the memory. At step S313, PI control computation is performed on the difference between the target current and the current detection signal, and the drive voltage command value is set. The drive voltage command value is output as a PWM signal, for example, and applied to the terminal of the motor 9 for driving. The operation from the steps S301 to S313 is repeated with respect to each control sampling. Note that maps and constants such as proportionality coefficients necessary for computation of the target current such as the map showing the relation between the torque sensor output and the auxiliary torque current used at step S303, the gain used at step S305 for converting the drive current HPF output into the vibration acceleration in the motor rotational direction, the gain used at step S309 for computing the reaction force torque acceleration signal by multiplying the motor vibration angle signal by gain, and the control gain used at step S310 for computation of the damping current are set in a ROM in advance.

Here, since the operation from step S305 to step S309 is different from that in embodiment 1, this part will be further explained. The relation between the current and the motor torque is a known value as torque constant Kt as described above. By dividing it by rotation moment of inertia Jm, conversion into the motor torque vibration acceleration in the motor rotational direction may be performed. Concurrently, the reaction force torque from the torque sensor and the reaction force torque from the tire that have been neglected in embodiment 1 are transmitted to the motor even though their influence is small. Further, since these torques are dominated by those due to the torsion deformation of the torsion bar of the torque sensor and the tire, the torques are proportional to the rotational angle. Since the steering frequency component is removed by the drive current HPF 4, by multiplying the motor vibration angle signal obtained by integration of the motor vibration angle velocity signal by spring constant Ks of the torsion bar, the vibration torque in the motor rotational direction is obtained. Accordingly, the vibration torque may be converted into the vibration acceleration in the motor rotational direction by dividing it by the rotation moment of inertia Jm. Therefore, conversion into the reaction force torque vibration acceleration in the motor rotational direction may be performed by multiplying the motor vibration angle signal by gain Ks/Jm.

As described above, the more correct motor vibration acceleration in the motor rotational direction can be computed by adding the reaction force torque vibration acceleration to the motor torque vibration acceleration, and the more correct motor vibration velocity in the motor rotational direction can be computed by integration of it.

Thus, in the embodiment 2, since the damping current is computed based on the motor vibration velocity obtained by integration of the sum of the motor vibration acceleration computed from the current detection signal from which the steering frequency component has been removed and the torque vibration acceleration due to the torsion deformation of the torsion bar of the torque sensor and the tire, even when the above described inexpensive torque detecting means with the accuracy not high enough is used, damping control may be performed by estimating the correct motor vibration velocity, and, if torque-proportional gain is made greater, oscillation of the control system can be prevented. Therefore, the effect of damping may be stronger by increasing the damping control gain of the damping controller 6, and thus, the steering torque can be reduced while the operator may not feel the vibration of the handle.

Figure 3:
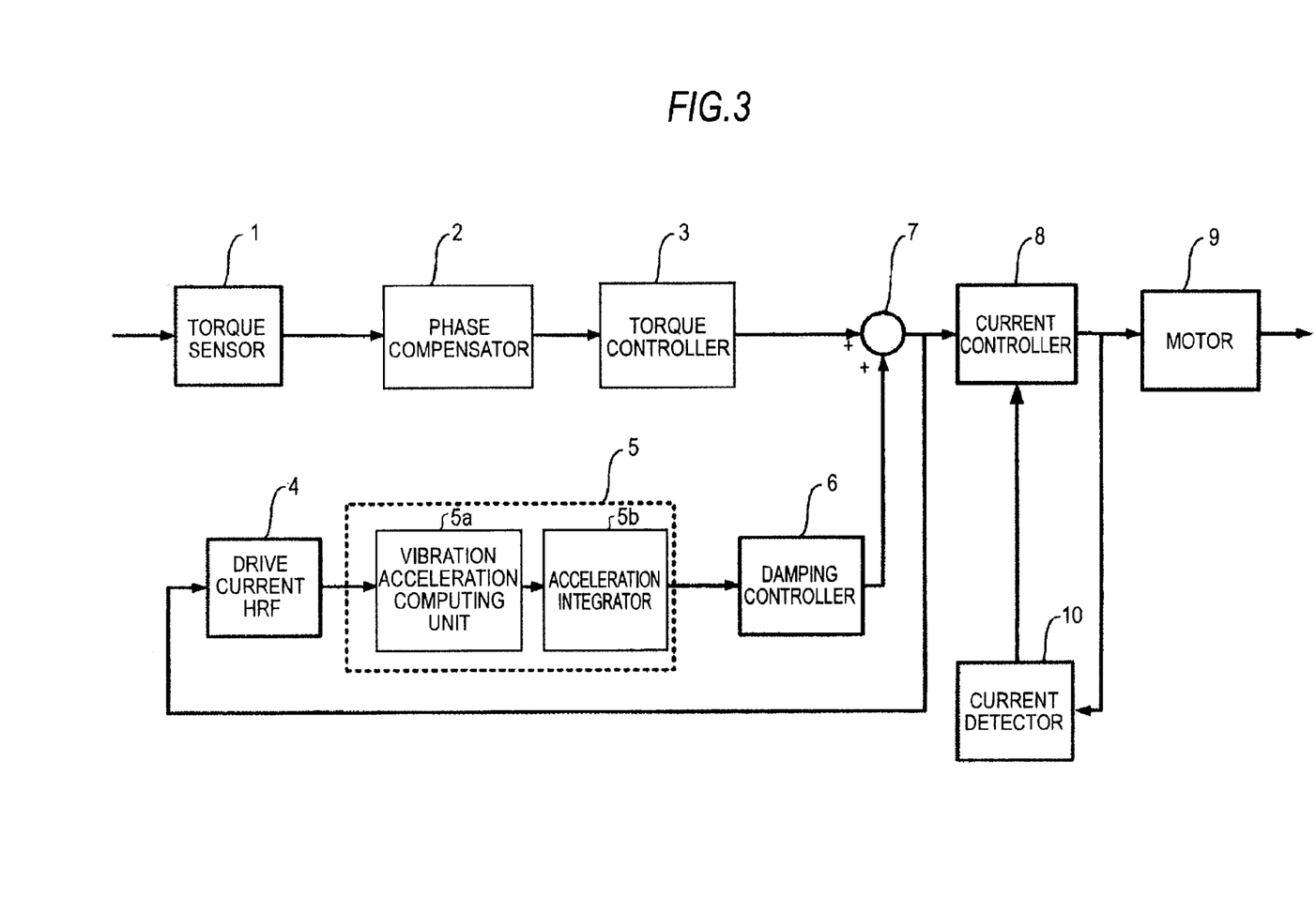
FIG. 3 A block diagram showing a configuration of another electric power steering control apparatus according to embodiment 1 of the invention.
Figure 4:
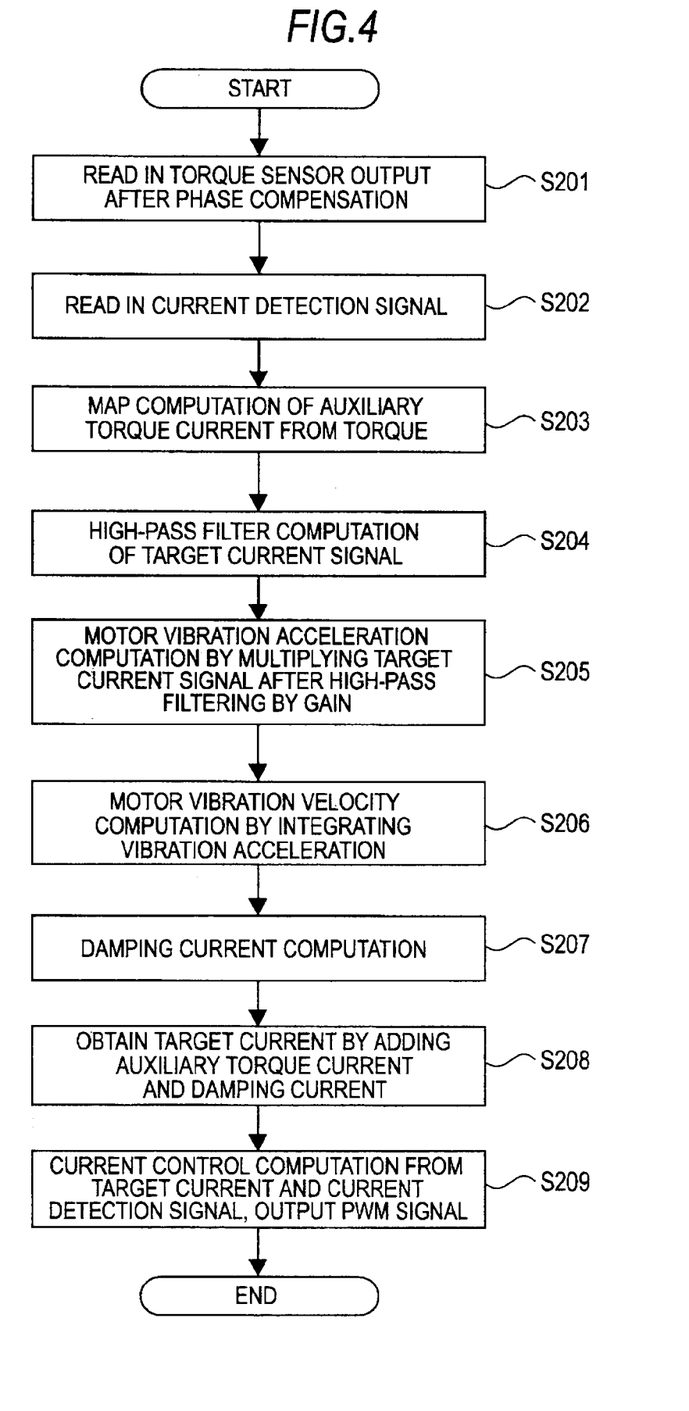
FIG. 4 A flowchart showing another algorithm according to embodiment 1 of the invention.

Further, in embodiments 1 and 2, the signal input to the drive current HPF has been the output of the current detector 10, however, it may be the target current. For example, in embodiment 1, when the output of the current detector 10 is the target current, the configuration shown in the block diagram of FIG. 3 and the flowchart of FIG. 4 is used. Here, as the target current, the computation value in the previous sampling may be used.

Figure 7:
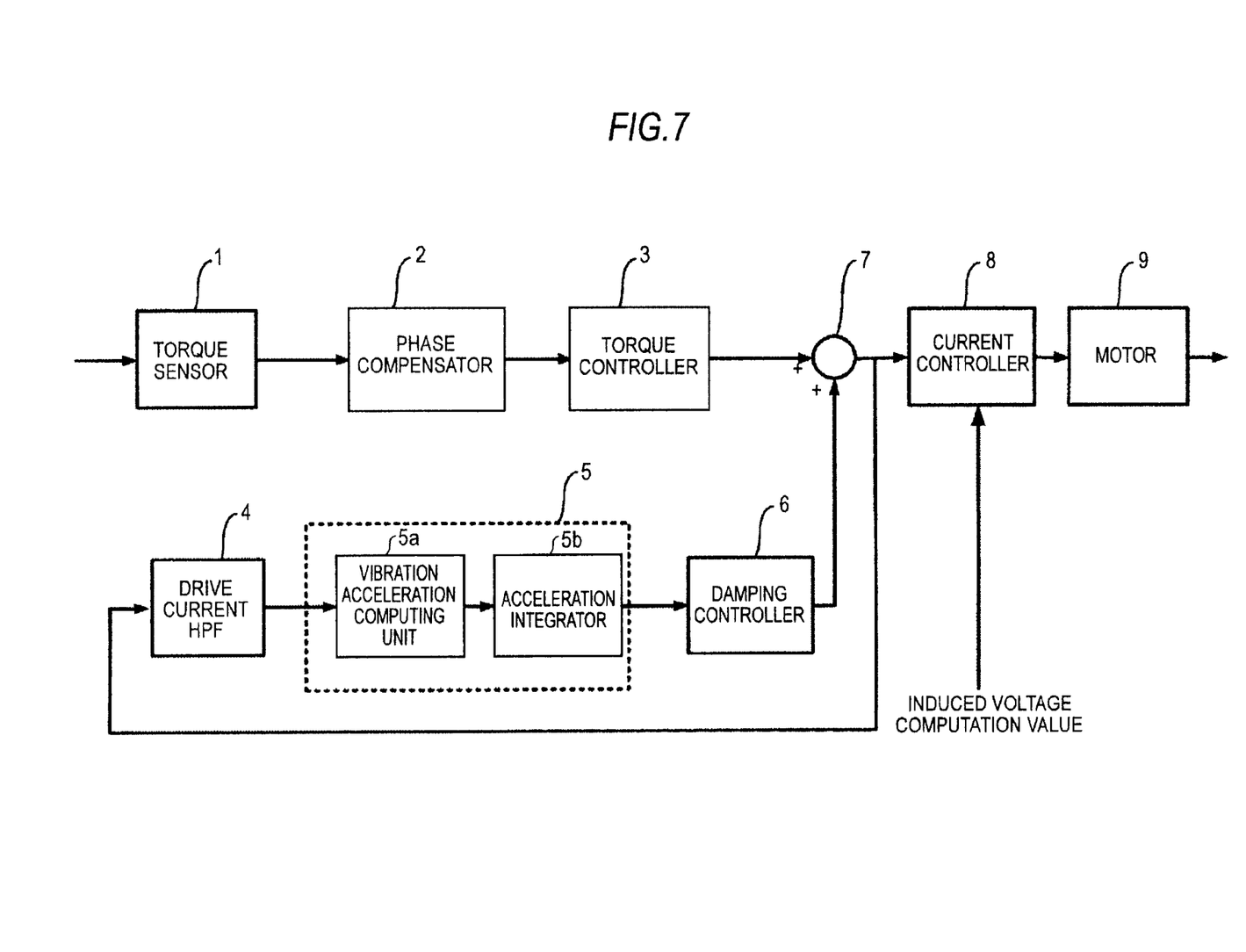
FIG. 7 A block diagram showing a configuration of another electric power steering control apparatus according to embodiment 1 of the invention.
Figure 8:
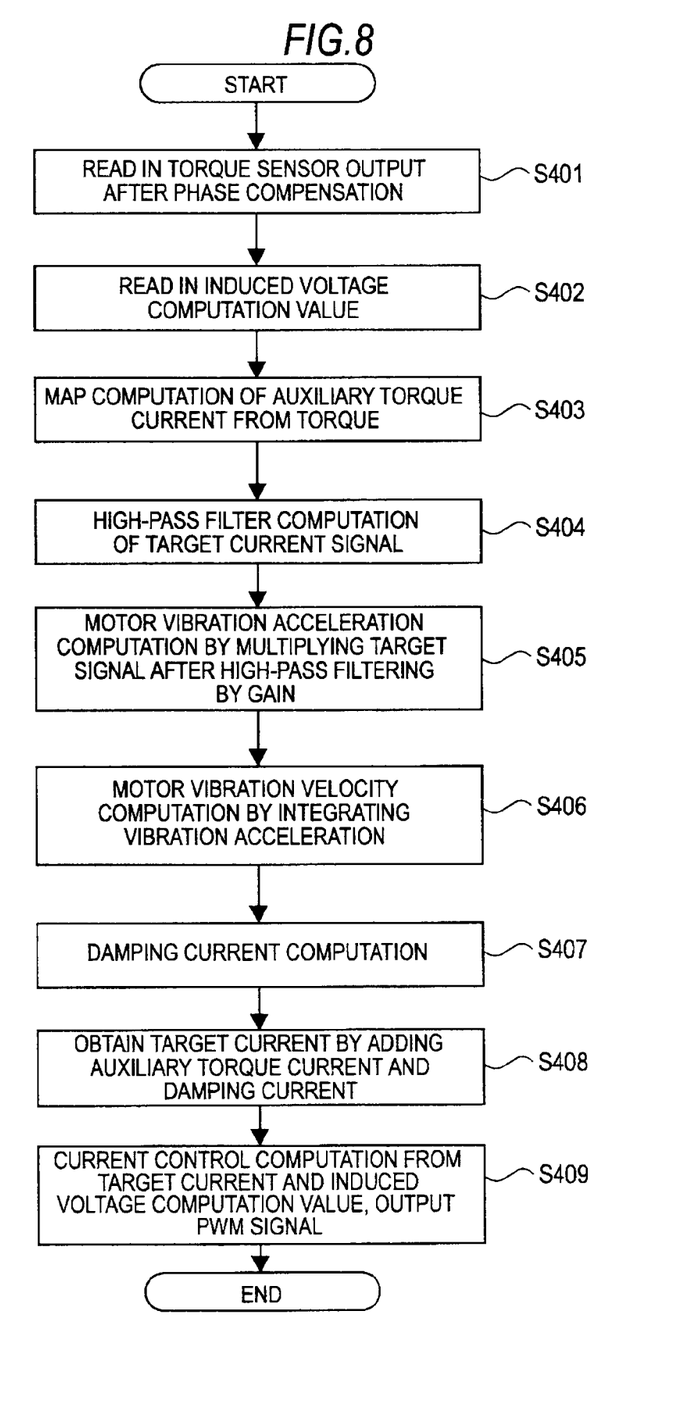
FIG. 8 A flowchart showing another algorithm according to embodiment 1 of the invention.

Furthermore, there is a system of performing current control from the target current and an induced voltage computation value without performing current detection, and, in this case, the configuration shown in the block diagram of FIG. 7 and the flowchart of FIG. 8 is used. Here, since it is known that the induced voltage is proportional to the motor rotational speed, the voltage is obtained using the motor rotational speed sensor such as a resolver. In this case, as described above, principally and generally, the frequency steerable by an operator is about 3 Hz or less, and the induced voltage is dominated by the steering frequency component, and thus, it is desirable that the motor rotational speed sensor may have characteristics that enables detection in the steering frequency band without shifts of phase and gain. For current control, there is a system of performing current control from the target current and the induced voltage computation value, and, the configuration described in the paragraph is applicable to an electric power steering control apparatus of the system.

Moreover, the acceleration integrator 5b and the velocity integrator 5c have been simple integrators, however, for example, they may integrate the signal passed through the high-pass filter shown in the expression (3).

$$T_4 s/(T_4 s+1) \tag{3}$$

Since the transfer function of the integrator is $$1/s \tag{4},$$

by the integration of the signal passed through the high-pass filter, the following transfer function is obtained by multiplying a low-pass filter by gain.

$$T_4/(T_4 s+1) \tag{5}$$

Here, $T_4$ is a time constant, and, given that a corner frequency is $f_4$ [Hz], the following expression is obtained.

$$T_4 = 1/\{f_4 \times (2\pi)\} \tag{6}$$

Regarding the time constant, when vibration occurs at 30 Hz, for example, the corner frequency $f_4$ is set in a range less than the vibration frequency such that 30 Hz or less.

In this case, because of quasi-integration, not integrated in the frequency range less than the corner frequency $f_4$, even when there is offset in the signal, drift due to integration can be prevented.

The invention claimed is:
1. An electric power steering control apparatus comprising:
    steering torque detecting means for detecting a steering torque by an operator from a relative angle of a torsion bar;
    a torque controller that computes an auxiliary torque current for assisting the steering torque based on the detected steering torque signal;
    a motor that generates a torque for assisting the steering torque;

current steering component removing means for removing a component by steering from a detection value or a command value of a current passed through the motor;

vibration velocity estimating means for estimating a vibration velocity in a rotational direction of the motor; and a damping controller that computes a damping current to be added to the auxiliary torque current using an estimation value of the estimated motor vibration velocity, wherein the vibration velocity estimating means includes vibration acceleration computing means for computing vibration acceleration in the rotational direction of the motor by multiplication of a motor current output from the current steering component removing means, and rotational acceleration integrating means for computing the vibration velocity in the motor rotational direction by integrating an output of the vibration acceleration computing means.

2. The electric power steering control apparatus according to claim 1, comprising:

velocity integrating means for computing a vibration angle in the rotational direction of the motor by integrating an output of the vibration velocity estimating means for estimating the vibration velocity in the rotational direction of the motor;

reaction force torque acceleration computing means for computing reaction force torque acceleration as an output of a reaction force torque from a torque sensor and a reaction force torque from a tire in a dimension of acceleration from the vibration angle in the motor rotational direction; and acceleration adding means for computing motor vibration acceleration by adding an output of motor torque vibration acceleration computing means that has computed the vibration acceleration in the rotational direction of the motor by multiplication of the motor current output from the current steering component removing means, wherein the rotational acceleration integrating means integrates an output of the acceleration adding means.

3. The electric power steering control apparatus according to claim 1, wherein a high-pass filter with a corner frequency set in a range equal to or less than the vibration frequency in the rotational direction of the motor is inserted into the rotational acceleration integrating means or the velocity integrating means.

4. The electric power steering control apparatus according to claim 1, wherein an input signal to the current steering component removing means is an output of a current detector or a target current.

5. The electric power steering control apparatus according to claim 2, wherein a high-pass filter with a corner frequency set in a range equal to or less than the vibration frequency in the rotational direction of the motor is inserted into the rotational acceleration integrating means or the velocity integrating means.

6. The electric power steering control apparatus according to claim 2, wherein an input signal to the current steering component removing means is an output of a current detector or a target current.

7. The electric power steering control apparatus according to claim 3, wherein an input signal to the current steering component removing means is an output of a current detector or a target current.

8. The electric power steering control apparatus according to claim 5, wherein an input signal to the current steering component removing means is an output of a current detector or a target current.

* * * * *